United States Patent
Cofoid et al.

[15] 3,681,992
[45] Aug. 8, 1972

[54] WEATHER INSTRUMENT FOR INDICATING COMFORT TEMPERATURE AND RELATIVE HUMIDITY VALUES

[72] Inventors: Robert D. Cofoid, Tonica; Clarence J. Goodwin, Peru, both of Ill.

[73] Assignee: General Time Corporation, Stamford, Conn.

[22] Filed: Nov. 21, 1969

[21] Appl. No.: 878,664

[52] U.S. Cl.......................................73/336, 73/344
[51] Int. Cl. .........................G01n 19/10, G01w 1/06
[58] Field of Search...............................73/336, 344

[56] References Cited

UNITED STATES PATENTS

| | | | |
|---|---|---|---|
| 2,019,886 | 11/1935 | Bogoslowsky | 73/336 X |
| 2,874,571 | 2/1959 | Hevener | 73/336 |
| 3,214,975 | 11/1965 | Solecki | 73/336 |
| 3,521,488 | 7/1970 | Preiser | 73/336 |

Primary Examiner—Louis R. Prince
Assistant Examiner—Denis E. Corr
Attorney—Pennie, Edmonds, Morton, Taylor and Adams

[57] ABSTRACT

A weather instrument including a hygrometer and thermometer, and means operatively associated therewith for providing an indication of either the temperature or relative humidity required to maintain a predetermined temperature humidity index. In one embodiment, a cam-filament arrangement responds to the sensed ambient temperature to automatically provide an indication of the relative humidity required to maintain a predetermined temperature humidity index, and this indication is displayed in conjunction with the indication of the ambient relative humidity. In another embodiment, a cam-filament arrangement responds to the sensed relative humidity to automatically provide an indication of the temperature required to maintain a predetermined temperature humidity index, and this indication is displayed in conjunction with the indication of ambient temperature. A cam means is provided for adjusting the cam-filament system to provide indications of the temperature or relative humidity required to maintain different predetermined temperature humidity values at different seasons of the year.

6 Claims, 6 Drawing Figures

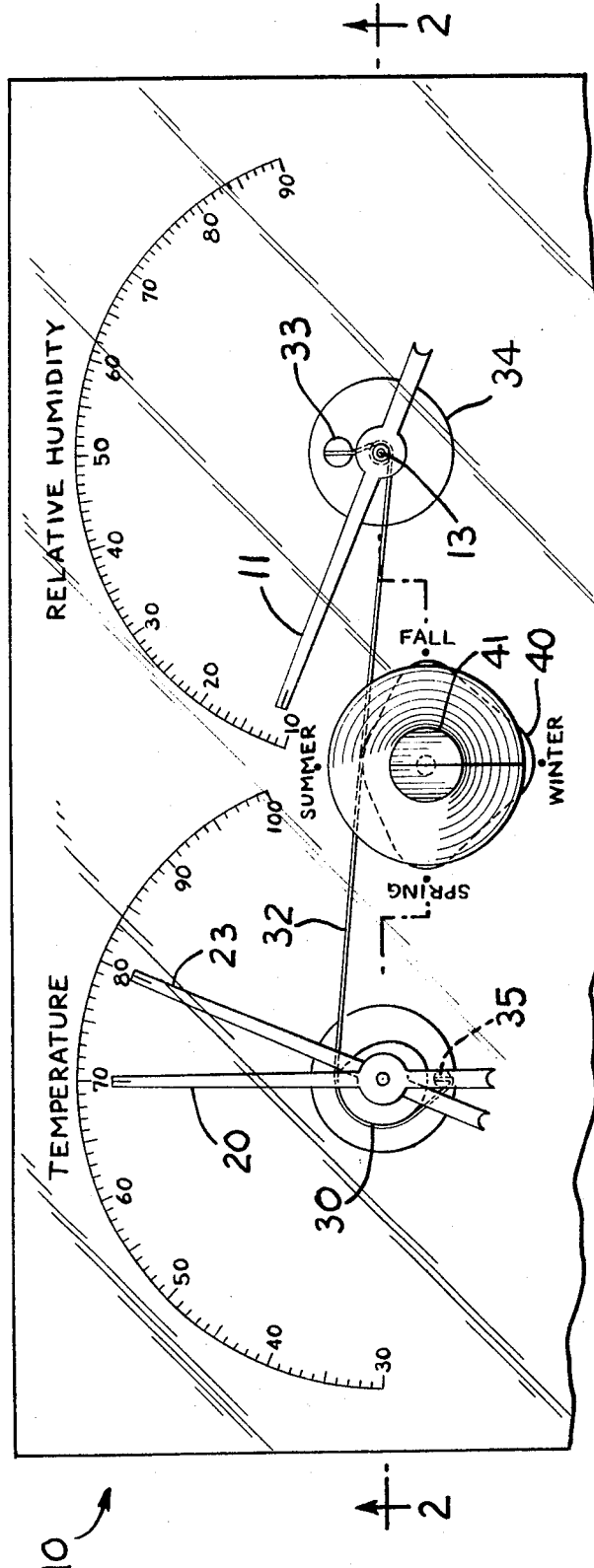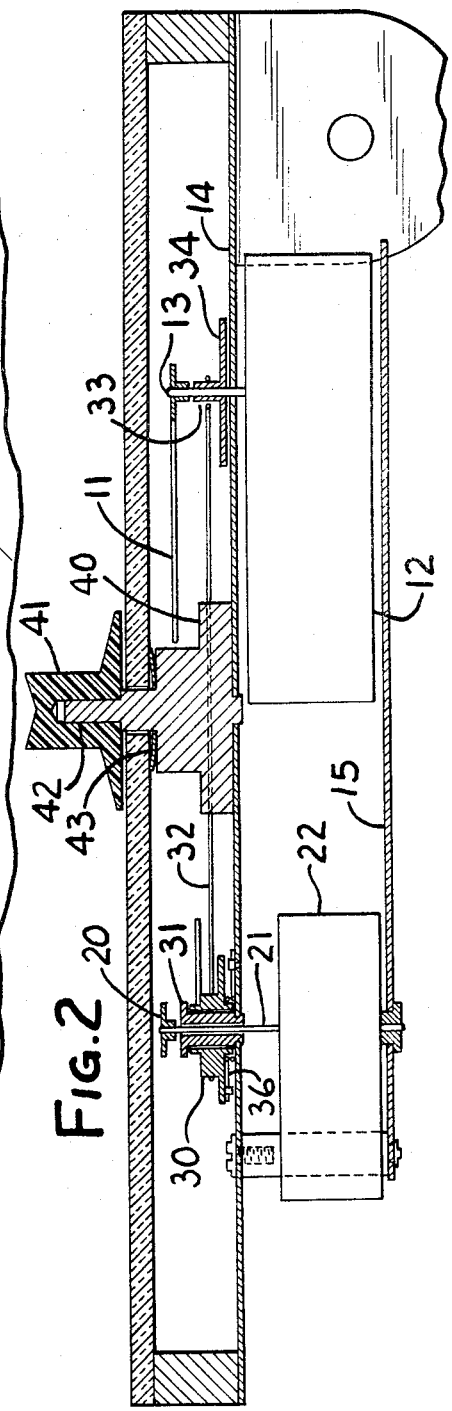

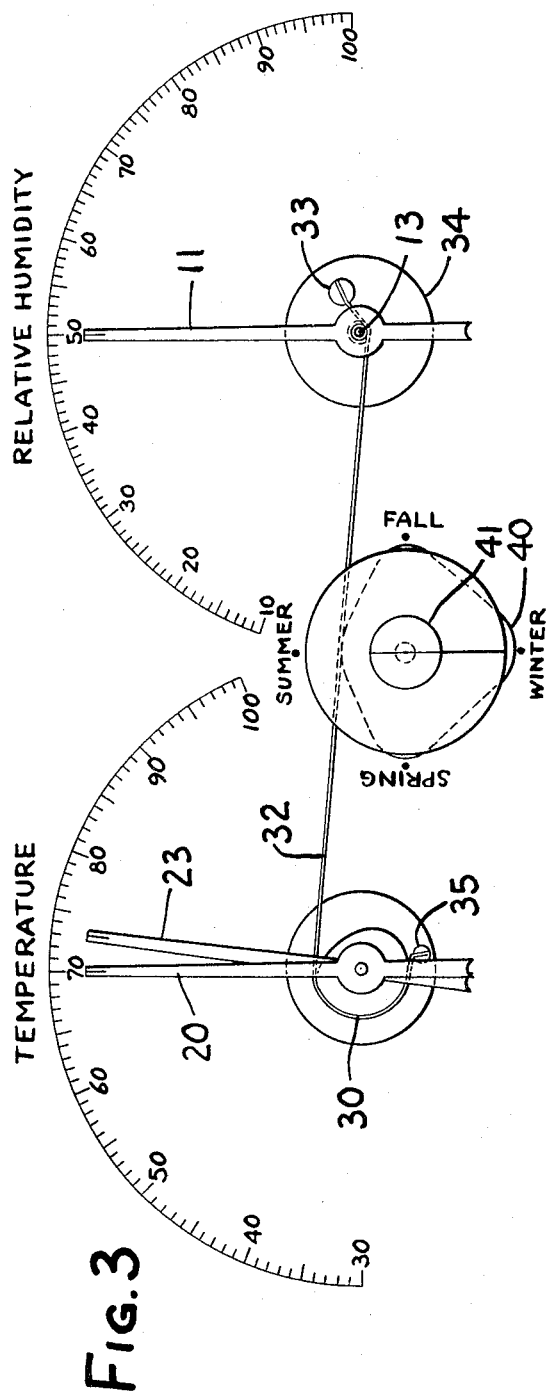
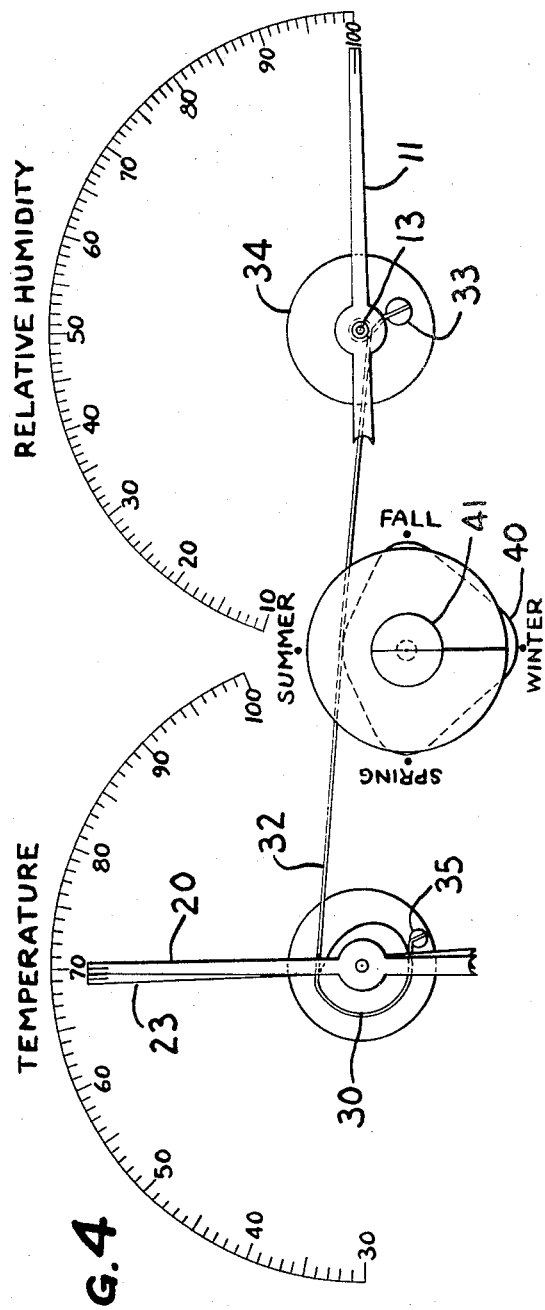
FIG. 3
FIG. 4
INVENTORS
ROBERT D. COFOID
CLARENCE J. GOODWIN
by: Wolfe, Hubbard, Voit & Osann
ATTYS.

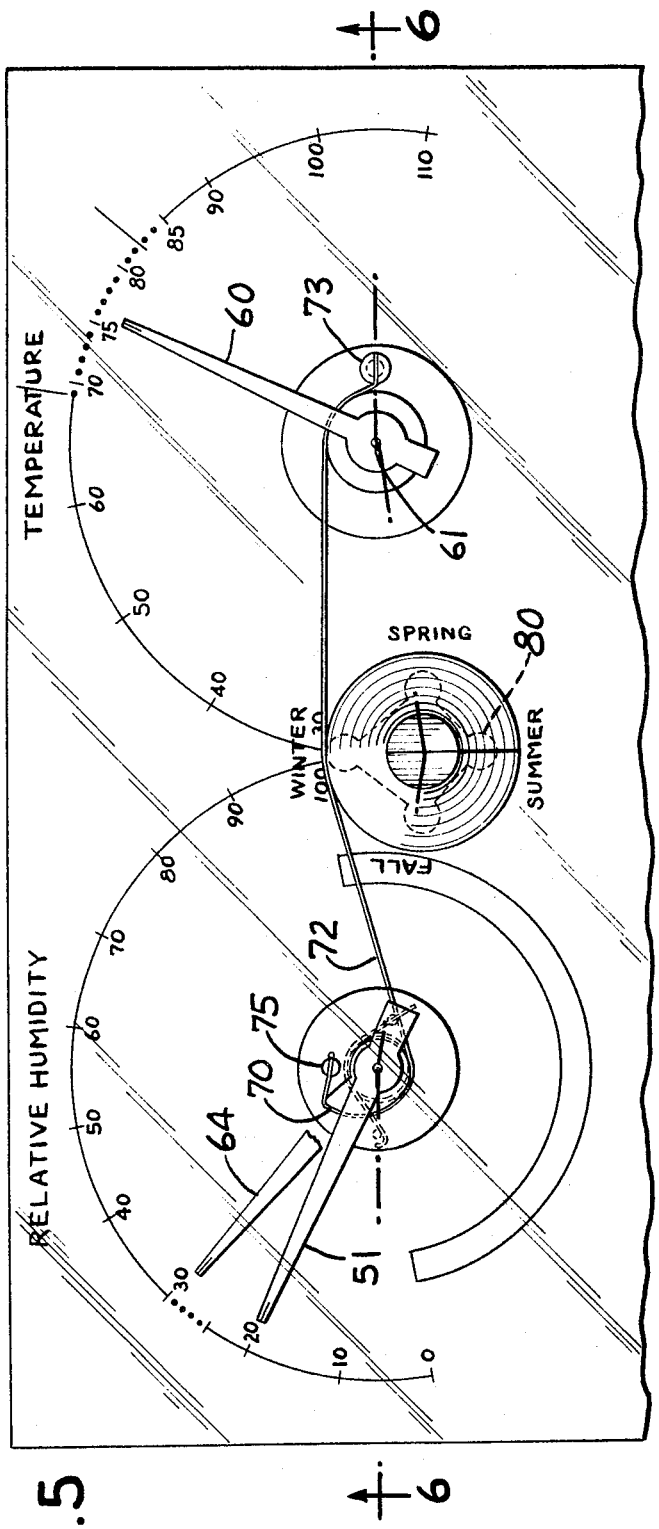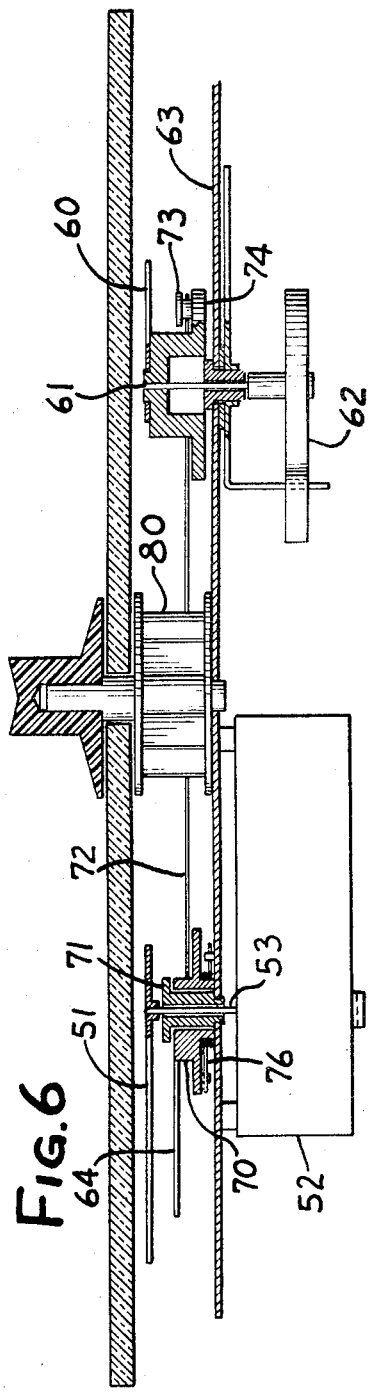

WEATHER INSTRUMENT FOR INDICATING COMFORT TEMPERATURE AND RELATIVE HUMIDITY VALUES

The present invention relates generally to weather instruments, and, more particularly, to instruments which indicate the temperature and relative humidity required to provide a predetermined temperature humidity index.

The temperature-humidity index, referred to hereinafter as THI, is a number for indicating the comfort or discomfort of persons as a function of the temperature and relative humidity of the ambient atmosphere. The THI number is determined by a formula prescribed by the United States Weather Bureau as:

$$THI = Td - 0.55(1-RH)(Td-58)$$

where

THI is the temperature-humidity index expressed as a number, $Td$ is the dry bulb thermometer reading in degrees F., and R.H. is the percent relative humidity expressed as a decimal fraction.

It is a primary object of the present invention to provide an improved instrument which senses at least one condition of the ambient atmosphere, such as temperature or relative humidity, and produces a continuous output representing the value of another condition required to provide a predetermined THI.

One particular object of the invention is to provide an improved instrument of the foregoing type which senses the temperature of the ambient atmosphere and provides a continuous indication of the relative humidity required to provide a predetermined THI. Another particular object of the invention is to provide an instrument which senses the relative humidity and produces a continuous indication of the temperature required to maintain a predetermined THI.

Another object of the invention is to provide an instrument of the type described above which automatically selects different predetermined the values for different seasons of the year.

It is a further object of the present invention to provide such an improved instrument which produces a continuous output which varies as a linear function of the particular condition to be varied to maintain a predetermined THI. Thus, a related object of the invention is to provide such an instrument which can be used with linearly calibrated scales, or with an automatic control system requiring a linear input.

Still another object of the invention is to provide such an instrument which has a high degree of accuracy over relatively wide ranges of temperature and relative humidity.

A still further object of the invention is to provide such an improved instrument which provides a continuous indication of both the sensed condition of the ambient atmosphere and the condition to be adjusted to maintain a selected THI.

Yet another object of the invention is to provide an instrument of the type described above which can be manufactured simply and rapidly at a low cost, and yet is accurate and reliable over long operating periods. In this connection, a related object is to provide such an instrument which can be efficiently manufactured at high production rates.

Other objects and advantages of the invention will become apparent upon reading the following detailed description and upon reference to the drawings, in which:

FIG. 1 is a front elevation view of the indicating and calculating portion of a weather instrument embodying the present invention;

FIG. 2 is a section taken along 2—2 in FIG. 1;

FIG. 3 is a front elevation of the same structure shown in FIG. 1 at a different relative humidity reading;

FIG. 4 is a front elevation of the same structure shown in FIG. 1 at still another different relative humidity reading;

FIG. 5 is a front elevation of the indicating and calculating portion of another instrument embodying the invention; and FIG. 6 is a section taken along line 6—6 in FIG. 5.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention.

Turning now to the drawings and referring first to FIG. 1, there is illustrated a weather instrument 10 having two different meters for providing separate indications of temperature and relative humidity. The two meters may be compactly contained in a single housing, and the two meters function automatically to provide continuous direct readings of the temperature and relative humidity of the ambient atmosphere, i.e., it is not necessary for the viewer to manipulate any manual adjusting, computing, or calculating mechanism. In other words, the person reading the instrument simply looks at the meters and observes the positions of the various pointers relative to the associated numerical scales of temperature and relative humidity.

The pointer 11 associated with the relative humidity (RH) scale is mounted on the output shaft of a hygrometer unit 12, which is preferably of the type described in a copending R.H. Preiser et al. application Ser. No. 628,166, filed Apr. 3, 1967, now U.S. Pat. No. 3,460,388 entitled "Hygrometer" and assigned to the assignee of the present invention. The hygrometer described in the copending application produces a linear output, and thus is ideally suited for use in the instrument of the present invention. The pointer 11 is fixed to the output shaft 13 of the hygrometer unit 12, and cooperates with a calibrated relative humidity dial on the front of the display plate 14 of the instrument to provide a continuous direct reading of the relative humidity sensed by the hygrometer unit 12.

The thermometer portion of the illustrative instrument includes a pointer 20 secured to the output shaft 21 of a temperature sensing unit 22. The temperature sensing unit 22 is a conventional unit, typically including a bimetal coil or the like to rotate the shaft 21 in response to changes in the ambient temperature. Both the hygrometer unit 12 and the temperature sensing unit 22 are mounted between the display plate 14 and a rear mounting plate 15. As the thermometer shaft 21 is rotated, the pointer 20 cooperates with a calibrated temperature scale on the front of the display plate 14 so as to provide a continuous direct reading of the ambient temperature.

In accordance with one important aspect of the present invention, the comfort temperature required to maintain a predetermined temperature-humidity index is automatically and continuously determined by an automatic calculating means responsive to the hygrometer output for producing a continuous comfort temperature output representing the temperature required to maintain the selected temperature-humidity index in the ambient atmosphere. Thus, in the illustrative embodiment of FIGS. 1 and 2, a comfort temperature pointer 23 is fixed to a cam 30 journalled on a bushing 31 fitted over the thermometer shaft 21. The peripheral surface of the cam 30 acts on a tensioned filament 32, one end of which is fixed to a pin 33 projecting from a disc 34 secured to the hygrometer shaft 13. The other end of the filament 32 is secured to a pin 35 formed as an integral part of the cam member 30. To hold the filament under constant tension, a spring 36 coiled around the indented rear side of the cam member 30 biases the cam member 30, and thus the pin 35, in the counterclockwise direction as viewed in FIG. 1. Since the cam 30 and the pin 35 are preferably formed as a single integral unit, made of molded plastic for example, these elements can be reliably reproduced with a fixed relationship with each other, even at high production rates. As the hygrometer unit 12 rotates the shaft 13 in response to changing relative humidity conditions, the filament 32 is displaced longitudinally, against the bias of the spring 36, to provide a continuous output corresponding to the relative humidity of the ambient atmosphere.

In keeping with the present invention, the cam 30 is designed so that the angular displacement thereof in response to longitudinal displacement of the filament 32 varies in accordance with the comfort temperature required to maintain a predetermined temperature humidity index. More particularly, the cam 30 is designed so that the angular displacement thereof corresponds to [THI − 31.9 (1−RH)/0.45 + 0.55 RH)] wherein THI is a predetermined comfort value for the temperature humidity index of the ambient atmosphere. It will be recognized that this function is derived from the previously described equation THI=TD−0.55 (1−RH)(TD −58); solving for TD, TD=THI − 31.9 (1−RH)/0.45 + 0.55 RH. One method of designing the cam 30 to follow this function is illustrated in the following table, where the predetermined value for THI is 69, RH is given in increments of 10 percent, the RH displacement equals 1.8° RH change, the temperature is calculated in accordance with the above formula, and the temperature displacement equals 2.25° per 1°F temperature change.

COMFORT CAM GENERATION CHART

| THI | R.H. | R.H. Displacement | Temperature T.D. | Temperature Displacement |
|---|---|---|---|---|
| 69 | 0% | 0° | *82.4 | 0° |
| 69 | 10% | 18° | 79.8 | 5.85 |
| 69 | 20% | 36 | 77.6 | 4.95 |
| 69 | 30% | 54 | 75.9 | 3.82 |
| 69 | 40% | 72 | 74.4 | 3.37 |
| 69 | 50% | 90 | 73.2 | 2.70 |
| 69 | 60% | 108 | 72.1 | 2.475 |
| 69 | 70% | 126 | 71.17 | 2.25 |
| 69 | 80% | 144 | 70.35 | 1.84 |
| 69 | 90% | 162 | 69.7 | 1.46 |
| 69 | 100% | 180 | 69 | 1.57 |

As can be seen from the above table, a change in RH from 0 to 10 percent rotates the hygrometer output shaft 13 by 18°, thereby rotating the pin 33 by 18°. During this same RH change, the above table indicates that the comfort temperature pointer 23 must move from the 82.4 position to the 79.8° F. position, a displacement of 5.58°. Thus, the cam 30 must be designed so that the filament displacement effected by the 18° displacement of the pin 33 produces a 5.85 angular displacement of the comfort temperature pointer 23.

In order that the operation of the illustrative instrument may be understood more clearly, the indicating and calculating system associated with the filament 32 has been shown for two different relative humidity and comfort temperature conditions in FIGS. 3 and 4. Thus, in FIG. 3, the relative humidity pointer 11 is at the 50 percent relative humidity position, the ambient temperature pointer 20 is at the 70° F. position, and the comfort temperature pointer is at the 73.2° F. position, which is the correct temperature TD to provide a THI of 69 at a relative humidity of 50 percent. In FIG. 4, the relative humidity has increased to 100 percent, thereby rotating the pin 33 in a clockwise direction and displacing the filament 32 to the left, rotating the cam 30 and the integral pin 35 in a counterclockwise direction to move the comfort temperature pointer to the 69° F. position. This is the correct comfort temperature for a THI of 69 at a relative humidity of 100 percent.

In accordance with a further aspect of the invention, a THI selection means is provided for selecting different predetermined THI values representing optimum comfort conditions for different seasons of the year. Thus, in the illustrative instrument, a THI selection cam 40 is adjustably mounted on the front of the instrument in operative association with the filament 32. It is known that the optimum THI value varies with different seasons of the year, primarily due to habits of dress for the different seasons. More particularly, the optimum winter THI is generally lower than the optimum summer THI, and the optimum THI, values for spring and fall are intermediate the summer and winter values.

In the particular instrument illustrated in FIGS. 1 through 4, the THI selection cam 40 is designed to select a constant THI value of 69 for the winter, 70.5 for the spring and fall, and 72 for the summer. For the purpose of adjusting the position of the cam 40 in accordance with seasonal changes, an adjustment nob 41 is secured to a stud 42 projecting forwardly from the cam 40 and formed as an integral part thereof. By turning the adjustment nob 41, the cam 40 is indexed to one of four seasonal positions marked on the face of the instrument. In the winter position, illustrated in FIGS. 1, 3, and 4, the cam 40 has little effect on the filament 32. However, when the cam 40 is turned to one of the other three positions, it can be seen that the peripheral surface of the cam displaces the central portion of the filament 32 upwardly, thereby effecting a predetermined angular adjustment of the comfort temperature pointer 23. For example, if the cam 40 is indexed from the winter position to the summer position, it can be seen that the comfort temperature pointer 23 will be automatically advanced in the clockwise direction, thereby providing slightly higher comfort temperature readings for any given relative humidity, so that the instrument indicates the temperature required to maintain a summer THI of 72. To hold the cam 40 in the particular position to which it is indexed by turning the knob 41, a spring washer 43 is disposed around an indented portion of the cam 41 adjacent the inner surface of the face plate of the instrument to frictionally retain the cam 40 at any selected position.

In accordance with another important aspect of the present invention, the comfort relative humidity required to maintain a predetermined temperature-humidity index is automatically and continuously determined by an automatic calculating means responsive to a thermometer output for producing a continuous comfort relative humidity output representing the relative humidity required to maintain the selected temperature-humidity index in the ambient atmosphere. Thus, in the modified instrument illustrated in FIGS. 5 and 6, the pointer 51 associated with the relative humidity scale is mounted on the output shaft of a hygrometer unit 52 of the same type described previously. This pointer 51 provides a continuous direct reading of the relative humidity sensed by the hygrometer unit 52.

For the purpose of providing a continuous direct reading of the ambient temperature, a pointer 60 is secured to the output shaft 61 of a temperature sensing unit 62 of the type described above. As the thermometer shaft 61 is rotated, the pointer 60 cooperates with a calibrated temperature scale on the front of the display plate 63 to provide an indication of the ambient temperature.

In keeping with this aspect of the invention, a comfort relative humidity pointer 64 is fixed to a cam 70 journalled on a bushing 71 fitted over the hygrometer shaft 53. The peripheral surface of the cam 70 acts on a tensioned filament 72, one end of which is fixed to a pin 73 projecting from a disc 74 secured to the thermometer shaft 61. The other end of the filament 72 is secured to a pin 75 formed as an integral part of the cam member 70. To hold the filament under constant tension, a spring 76 coiled around the indented rear side of the cam member 70 biases the cam member 70, and thus the pin 75, in the clockwise direction as viewed in FIG. 5. Since the cam 70 and the pin 75 are preferably formed as a single integral unit, made of molded plastic for example, these elements can be reliably reproduced with a fixed relationship to each other, even at high production rates. As the thermometer unit 62 rotates the shaft 61 in response to changing temperature conditions, the filament 72 is displaced longitudinally, against the bias of the spring 76, to provide a continuous output corresponding to the temperature of the ambient atmosphere.

In order to maintain a predetermined temperature-humidity index, the cam 70 is designed so that the angular displacement thereof in response to longitudinal displacement of the filament 72 varies in accordance with the comfort relative humidity required to maintain the predetermined temperature-humidity index. More particularly, the cam 70 is designed so that the angular displacement thereof corresponds to $[1 - \text{THI}-\text{TD}/3\ 1.9 - 0.55\ \text{TD})]$ wherein THI is a predetermined comfort value for the temperature humidity index of the ambient atmosphere. It will be recognized that this function is derived from the previously described equation $\text{THI}=\text{TD}-0.55(1-\text{RH})(\text{TD}-58)$; solving for RH, $\text{RH} = [\text{THI}-\text{TD}/ 1-31.9 - 0.55\ \text{TD}]$. One method of designing the cam 70 to follow this function is illustrated in the following table, where the predetermined value for THI is 69, TD is given in increments of either 1 or 2°, the TD displacement equals 2.25° per 1° F. TD change, the relative humidity RH is calculated in accordance with the above formula, and the relative humidity displacement equals 1.8° per 1 percent RH change.

Comfort R.H. Indicator Cam Generation and Temperature Output Drum Development

Chart

| THI Ambient Temp. of | Temp. Output Displacement 2.25 Per 1°F change | Comfort R.H. | Comfort R.H. indicator cam cam disposition 1.8 per 1% R.H. change |
|---|---|---|---|
| 69 |  | 100% |  |
| 70 | 2.25° | 84.85 | 27.3° |
| 71 | 4.50 | 77.03 | 50.35 |
| 72 | 6.75 | 61.04 | 70.03 |
| 73 | 9.00 | 51.52 | 87.16 |
| 74 | 11.25 | 43.19 | 102.16 |
| 75 | 13.50 | 35.83 | 115.41 |
| 76 | 15.75 | 29.3 | 127.16 |
| 78 | 20.25 | 18.19 | 147.16 |
| 80 | 24.75 | 9.1 | 163.52 |
| 82 | 29.25 | 1.5 | 177.20 |
| 82.4 | 30.15 | 0 | 180.00 |

As can be seen from the above table, a change in TD from 70° F to 71° F rotates the thermometer output shaft 61 by 2.25°, thereby rotating the pin 73 by 2.25°. During this same TD change, the above table indicates that the comfort relative humidity pointer 64 must move from the 84.85 percent position to the 77.03 percent position, a displacement of 23.05 degrees. Thus, the cam 70 must be designed so that the filament displacement effected by the 2.25° displacement of the pin 73 produces a 23.05° angular displacement of the comfort relative humidity pointer 64. Thus, it can seen that the operation of the instrument of FIGS. 5 and 6 is similar to that of the previously described instrument of FIGS. 1 through 4, except that the functions of the thermometer and hygrometer are reversed.

We claim as our invention:

1. A weather instrument comprising the combination of humidity responsive means for producing a first continuous output varying in accordance with the relative humidity of the ambient atmosphere, automatic calculating means responsive to said first continuous output for producing a second continuous output representing the comfort temperature required to maintain a predetermined temperature-humidity index, ambient temperature sensing and indicating means providing a continuous indication of the temperature of the ambient atmosphere, said ambient temperature indicating means being operatively associated with said comfort temperature indicating means for providing a continuous indication of the differential between said comfort temperature and the ambient temperature, and temperature-humidity selection means for automatically selecting different predetermined temperature-humidity index values, said predetermined values corresponding to different seasons of the year.

2. A weather instrument comprising the combination of first sensing means responsive to changes in relative humidity for producing a first continuous output corresponding to RH, where RH represents the percent relative humidity of the ambient atmosphere expressed as a decimal fraction, second sensing means responsive to changes in temperature for producing a second continuous output corresponding to the temperature of the ambient atmosphere, automatic calculating means responsive to said first output for producing a third continuous output corresponding to $THI-31.9(1-RH)/[.45 + 0.55 RH]$ wherein THI is a predetermined comfort value for the temperature-humidity index of the ambient atmosphere, comfort temperature indication means responsive to said third output for providing a continuous indication of the comfort temperature required to maintain said predetermined comfort value for the temperature-humidity index, ambient temperature indicating means responsive to said second output for providing a continuous indication of the ambient temperature, and THI selection means having a plurality of different settings corresponding to different seasons of the year for automatically selecting different predetermined THI values in response to the setting of said selection means for different seasons.

3. A weather instrument as set forth in claim 2 wherein said comfort temperature indicating means and said ambient temperature means are operatively associated to provide a continuous indication of the differential between said comfort temperature and said ambient temperature.

4. A weather instrument comprising the combination of temperature responsive means for producing a first continuous output varying in accordance with the temperature of the ambient atmosphere, automatic calculating means responsive to said first continuous output for producing a second continuous output representing the comfort relative humidity required to maintain a predetermined temperature-humidity index in the ambient atmosphere, comfort relative humidity indicating means responsive to said second output for providing a continuous indication of said comfort relative humidity required to maintain said predetermined temperature-humidity index, ambient relative humidity sensing and indication means providing a continuous indication of the relative humidity of the ambient atmosphere, said ambient relative humidity indicating means being operatively associated with said comfort relative humidity indicating means for providing a continuous indication of the differential between said comfort relative humidity and the ambient relative humidity, and temperature humidity selection means for automatically selecting different predetermined temperature-humidity index values, said predetermined values corresponding to different seasons of the year.

5. A weather instrument comprising the combination of first sensing means responsive to changes in temperature for producing a first continuous output corresponding to TD, where TD represents the temperature in °F of the ambient atmosphere, second sensing means responsive to changes in relative humidity for producing a second continuous output corresponding to the relative humidity of the ambient atmosphere, automatic calculating means responsive to said first output for producing a third continuous output corresponding to $[1 - (THI - TD)/(31.9 - 0.55 TD)]$ wherein THI is a predetermined comfort value for the temperature-humidity index of the ambient atmosphere, comfort relative humidity indicating means responsive to said third output for providing a continuous indication of the comfort relative humidity required to maintain said predetermined comfort value for the temperature-humidity index, and ambient relative humidity indicating means responsive to said second output for providing a continuous indication of the ambient relative humidity and THI selection means having a plurality of different settings corresponding to different seasons of the year for automatically selecting different predetermined THI values in response to the setting of said selection means for different seasons.

6. A weather instrument as set forth in claim 5 wherein said comfort relative humidity indicating means and said ambient relative humidity indicating means are operatively associated to provide a continuous indication of the differential between said comfort relative humidity and said ambient relative humidity.

* * * * *

UNITED STATES PATENT OFFICE
CERTIFICATE OF CORRECTION

Patent No. 3,681,992     Dated August 8, 1972

Inventor(s) Robert D. Cofoid and Clarence J. Goodwin

It is certified that error appears in the above-identified patent and that said Letters Patent are hereby corrected as shown below:

Col. 1, line 43, change "the" to -- THI --;
   Col. 3, line 40, delete "[THI-31.9(1-RH)/0.45 + 0.55RH)]" and insert -- [THI-31.9(1-RH)]/[0.45 + 0.55RH] --;
   Col. 3, line 45, delete "TD = THI-31.9(1-RH)/0.45 + " and insert -- TD = [THI-31.9(1-RH)]/[0.45 + --;
   Col. 3, line 46, insert a bracket (]) after 0.55RH ;
   Col. 3, in the table, under "Temperature Displacement" "2.70" is out of line;
   Col. 5, line 61, delete "[1-THI-TD/3" and insert -- [1-(THI-TD)/ --;
   Col. 5, line 62, delete "1.9-0.55TD)]" and insert -- (31.9-0.55TD)] --;
   Col. 5, line 67, delete "RH = [THI-TD/1-31.9-0.55TD]" and insert -- RH = 1-(THI-TD)/(31.9-0.55TD) --;
   Col. 6, in the heading of the table, cancel "cam" (second occurrence) before "disposition";
   Col. 6, line 56, after "index" insert -- in the ambient atmosphere, comfort temperature indicating means responsive to said second output for providing a continuous indication of said comfort temperature required to maintain said predetermined temperature-humidity index--;
   Col. 7, line 12, change ".45" to --0.45--.

Signed and sealed this 13th day of March 1973.

(SEAL)
Attest:

EDWARD M.FLETCHER,JR.                ROBERT GOTTSCHALK
Attesting Officer                    Commissioner of Patents